United States Patent [19]

Tailliet

[11] Patent Number: 5,903,607
[45] Date of Patent: May 11, 1999

[54] METHOD AND DEVICE FOR ENCODING AND TRANSMITTING BIDIRECTIONAL DATA FROM A MASTER CIRCUIT TO A SLAVE CIRCUIT

[75] Inventor: François Pierre Tailliet, Le Tholonet, France

[73] Assignee: SGS-Thomson Microelectronics S.A., Saint Genis, France

[21] Appl. No.: 08/824,962

[22] Filed: Mar. 27, 1997

[30] Foreign Application Priority Data

Mar. 28, 1996 [FR] France .................................. 96 03890

[51] Int. Cl.$^6$ .............................. H04B 3/00; H04B 1/38; H04L 25/00; H04L 5/16
[52] U.S. Cl. .......................... 375/257; 375/220; 375/238; 340/310.01; 340/310.06
[58] Field of Search .................................... 375/257, 258, 375/287, 312, 286, 288, 220, 238; 365/226, 189.09, 189.11, 189.01; 327/108, 112, 143; 340/310.01, 310.06

[56] References Cited

U.S. PATENT DOCUMENTS

| | | | |
|---|---|---|---|
| 4,423,506 | 12/1983 | Kawasaki et al. ...................... | 370/221 |
| 4,507,793 | 3/1985 | Adams ..................................... | 375/257 |
| 4,907,222 | 3/1990 | Slavik ..................................... | 370/85.7 |
| 4,949,359 | 8/1990 | Voillat ..................................... | 375/257 |
| 5,140,611 | 8/1992 | Jones et al. .................................. | 375/7 |
| 5,363,405 | 11/1994 | Hormel ....................................... | 375/7 |
| 5,473,635 | 12/1995 | Chevroulet ............................... | 375/287 |
| 5,585,744 | 12/1996 | Runas et al. .............................. | 326/86 |
| 5,644,255 | 7/1997 | Taylor ....................................... | 326/81 |

FOREIGN PATENT DOCUMENTS

| | | | |
|---|---|---|---|
| 0 134 174 | 3/1985 | European Pat. Off. ......... | H40Q 9/14 |
| 2072 467 | 9/1981 | United Kingdom ............ | H04L 11/16 |

OTHER PUBLICATIONS

French Search Report for FR 9603890, filed Mar. 28, 1996.

*Primary Examiner*—Stephen Chin
*Assistant Examiner*—Michael W. Maddox
*Attorney, Agent, or Firm*—Wolf, Greenfield & Sacks, P.C.

[57] ABSTRACT

A method and device for encoding and transmitting a clock signal, a supply voltage and bidirectional digital data from a master circuit to a slave circuit, including the steps of: holding a first conductor at a first voltage with respect to a second conductor; periodically raising the first conductor to a second voltage with respect to the second conductor, a fixed period after a previous raising to the second voltage; holding the first conductor at the second voltage for one of a number of predetermined periods, then returning the first conductor to the first voltage, the voltage of the first conductor not falling below the first voltage; controlling the predetermined periods to each have one of a number of fixed durations, each duration having a logical significance.

32 Claims, 7 Drawing Sheets

METHOD AND DEVICE FOR ENCODING AND TRANSMITTING BIDIRECTIONAL DATA FROM A MASTER CIRCUIT TO A SLAVE CIRCUIT

BACKGROUND OF THE INVENTION

1. Field of the Invention

The invention relates generally to the transmission of digital data along a communications bus and, more particularly, to serial communications over a communications bus containing a minimum number of conductors.

2. Discussion of the Related Art

Often, communications between two circuits take place over a communications bus between a "master" circuit and a "slave" circuit. In such an arrangement, the slave circuit typically sends data along the bus only in response to a request from the master circuit. This is particularly the case where a master circuit needs to communicate with a number of interchangeable or removable slave circuits. The slave circuits may include memory devices for storing information.

Such slave circuits may be, for example, tags used to identify articles, which are either brought only momentarily into contact with the communications bus, or which need to provide some information about themselves the first time that they are brought into contact with this bus.

Generally, a communications bus for use between a microprocessor master circuit and a memory device slave circuit comprises at least four conductors. A ground voltage supply, a power supply voltage, a clock signal and a bidirectional data conductor. Where chip select and deselect commands are needed, such conventional buses may include a dedicated combination of clock and data signals which are interpreted as chip select/deselect commands by the slave circuits.

Conventional communications buses are generally implemented as a two-wire communications bus. A typical two-wire communications bus is used in the Dallas Semiconductors DS2400 product. The communications bus includes one ground conductor and one signal conductor. The signals which are transmitted along the signal conductor typically comprise pulses of 0V to 5V relative to the ground conductor. A drawback to this known two conductor bus is that it does not efficiently transmit the power required by the slave circuit. Another disadvantage is that the master and slave circuits are not synchronized, as no clocking signals are common to both the master and slave circuits.

It is therefore an object of the invention to provide a communications bus which can communicate on as few a number of conductors as possible. This will allow simple installation of the bus, and allow the slave circuits to be packaged in very small, cheap packages.

SUMMARY OF THE INVENTION

An object of the present invention is to provide a method for bidirectional communication between a master circuit and a slave circuit, providing the necessary power supply, clock and control signals using a minimum number of conductors.

Another object of the present invention is to provide an identification tag which contains no power supply, but which may be driven by a communications bus which has a minimum number of connectors, yet conveys a power supply, clocking, data and control signals.

Another objective of the present invention is to provide a disposable item containing an identification tag, wherein the connection of a communications bus allows information about the disposable item to be read from and stored in the tag.

Accordingly, the present invention provides a method and device for encoding and transmitting a clock signal, a supply voltage and bidirectional digital data from a master circuit to a slave circuit, including the steps of: holding a first conductor at a first voltage; periodically raising the first conductor to a second voltage at a fixed period after a previous instance of raising the first conductor to the second voltage; holding the first conductor at the second voltage for predetermined periods, then returning the first conductor to the first voltage for a second predetermined period; controlling the predetermined periods to each have a logical significance; holding a second conductor at a third voltage different from the first and second voltages; measuring the voltage of the first conductor at a temporal offset with respect to the instant of the first conductor was raised to the voltage; interpreting the measured voltage according to the predetermined logical significances; and raising the first conductor to the second voltage, this raising being used as a clock signal.

In another aspect of the invention, a method for encoding and transmitting a clock signal, a supply voltage and bidirectional digital data from a master circuit to a slave circuit is disclosed. The method comprises the steps of: holding a first conductor at a first voltage for a first period; periodically raising the first conductor to a second voltage at a fixed period after a previous instance of raising the first conductor to the second voltage; holding the first conductor at the second voltage for predetermined periods; returning the first conductor to the first voltage for a second predetermined period; holding a second conductor at a third voltage different from the first and second voltages; measuring a voltage of the first conductor at a temporal offset with respect to the instant of the raising of the first conductor to the second voltage; and interpreting the measured voltage according to predetermined logical significances. The method may also include the step of raising the first conductor to the second voltage to identify a clock signal.

The step of holding the first conductor at the second voltage for predetermined periods includes the steps of holding the first conductor at the predetermined period of a first duration signifying a "0" bit; and holding the first conductor at the predetermined period of a second duration signifying a "1" bit.

In one embodiment of the invention, one of the first and second predetermined periods is longer than the fixed period to indicate a chip select command and another of the first and second predetermined periods is longer than the fixed period to indicate a chip deselect command.

In another aspect of the invention, a data communications system is disclosed. The system comprises a communications bus solely comprising first and second conductors; a master circuit communicably coupled to the communications bus including, means for holding the first conductor at one of two predetermined potentials, means for bringing the potential of the first conductor regularly, repeatedly, and with a fixed period, to a second potential before returning to the first potential; and a slave circuit communicably coupled to the communications bus, wherein the first and second potentials are different from a third potential to which the second conductor is brought to provide a power supply to the slave circuit.

In one embodiment, the data communications system master circuit output interface has an output impedance for voltages between the first and second voltages substantially higher than its output impedance for voltages of magnitude below a lower one of the fist and second voltages. In another embodiment, the data communications system slave circuit comprises means for providing a low impedance path between the first conductor and the second conductor to transmit a signal of a first polarity to the master circuit; and means for removing the low impedance path between the first conductor and the second conductor to transmit a signal of second polarity to the master circuit; and means for providing one or more preset delays from reception of each transition on the first conductor, and for providing a signal to an input interface of the slave circuit to cause the voltage on the first conductor to be measured, by comparison with a predetermined reference value, which lies between the first voltage and the second voltage.

In another aspect of the invention, a communications bus for communicating with identification tag is disclosed. The bus comprises a slave circuit connected to two external conductors and deriving its power from a dc voltage that is continually present between the two conductors, including, an output interface for providing a low impedance path between the two conductors to transmit a signal of a first polarity and no such low impedance path to transmit a signal of second polarity; and a timing circuit for providing timing delays relative to periodic changes in the voltage between the two conductors. In one embodiment, a toner cartridge for a printer comprises the identification tag.

BRIEF DESCRIPTION OF THE DRAWINGS

The invention is pointed out with particularity in the appended claims. The above and further advantages of the invention may be better understood by referring to the following description when taken in conjunction with the accompanying drawings, in which:

DETAILED DESCRIPTION

Figure 1:
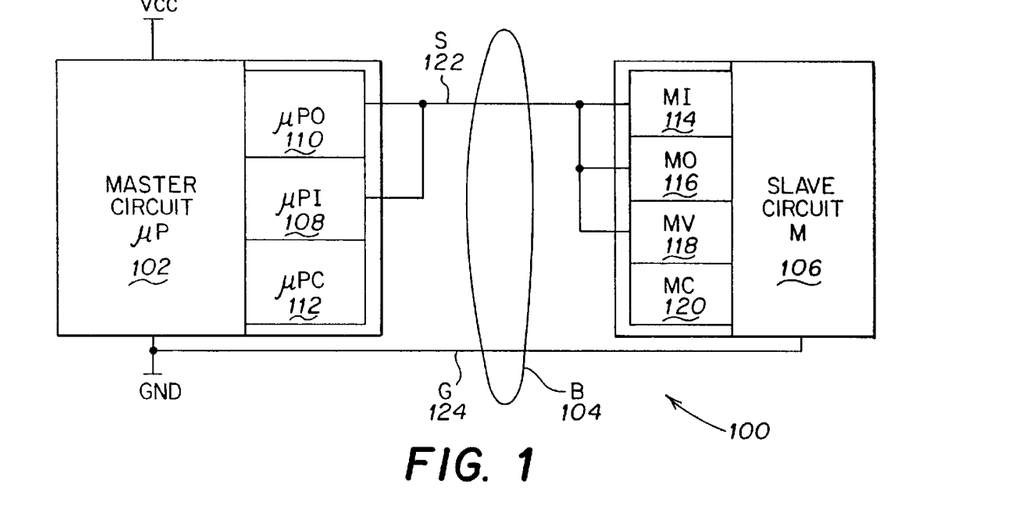
FIG. 1 shows a schematic diagram of one embodiment of an overall data bus system according to the present invention.

FIG. 1 is a schematic block diagram illustrating one embodiment of a data bus system 100 of the present invention. The master circuit 102, preferably a microprocessor ($\mu$P), is supplied by supply voltages Vcc and GND. Normally, these are set at +5V and 0V, respectively. A communications bus B 104 connects the master circuit 102 to a slave circuit 106. In the illustrative embodiment, the slave circuit 106 does not have separate supply voltage connections. The master circuit 102 contains input interface ($\mu$PI) 108 and output interface ($\mu$PO) 110, and a clock generating circuit ($\mu$PC) 112. The slave circuit 106 contains an input interface (MI) 114 and an output interface (MO) 116, a supply voltage generating circuit (MV) 118 for supplying a voltage to the slave circuit 106, and a timing circuit (MC) 120. The two conductors making up the communications bus 104 are a signal conductor 122 and a ground conductor 124. The ground conductor 124 is connected to GND, and the signal conductor 122 is connected to all of the input and output interfaces 108, 110, 114 and 116 and the supply voltage generating circuit 118.

According to an aspect of the invention, the voltage of the signal connector may take one of two values—a higher value V1 and a lower value V0. In one embodiment of the invention, these values are +5V and +3V, respectively. Because the voltage between the two conductors 122 and 124 never falls below the lower value V, a stable supply voltage to the slave circuit 106 may easily be derived from the voltage of the signal conductor 122, by supply voltage generating circuit 118. This may be done in one of the following at least three ways, as illustrated in FIGS. 2–4.

Figure 2A:
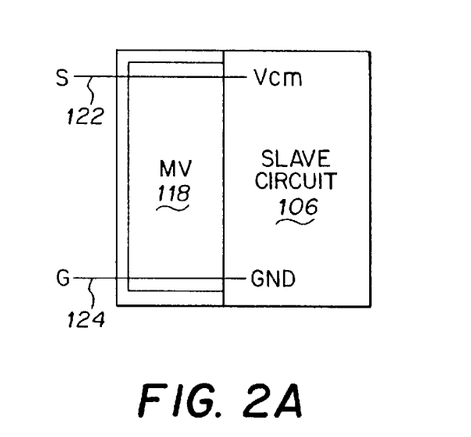
FIG. 2A shows a voltage supply circuit that may be used in the system of FIG. 1.
Figure 2B:
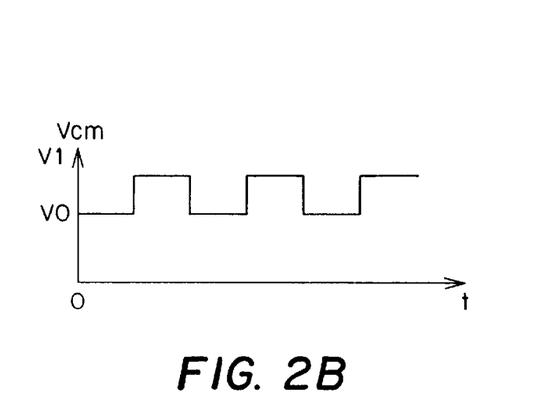
FIG. 2B shows a supply voltage of the voltage supply circuit illustrated in FIG. 2A.

FIG. 2A is a schematic block diagram illustrating one embodiment of supply voltage generating circuit 118. FIG. 2B is a signal diagram of the supply voltage of the slave circuit illustrated in FIG. 2A. The supply voltage Vcm of the slave circuit 106 is derived directly from the communications bus conductors 122, 124. This will give a supply voltage Vcm which fluctuates between V1 and V0, as shown in FIG. 2B.

Figure 3A:
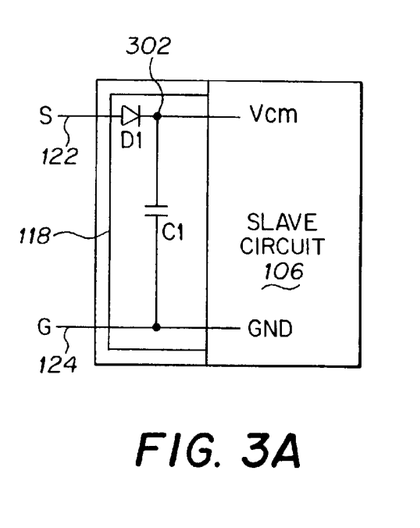
FIG. 3A shows a voltage supply circuit that may be used in the system of FIG. 1.
Figure 3B:
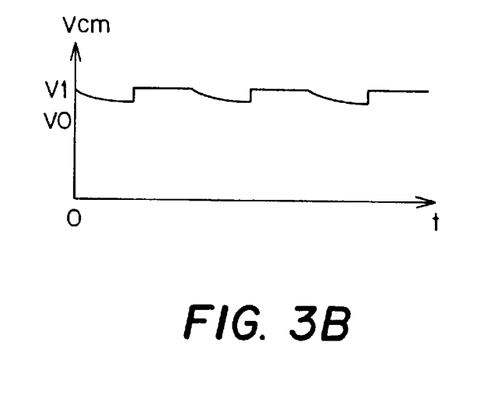
FIG. 3B shows a supply voltage of the voltage supply circuit illustrated in FIG. 3A.

FIG. 3A is a schematic block diagram illustrating another embodiment of supply voltage generating circuit 118. FIG. 3B is a signal diagram of a supply voltage of the slave voltage generating circuit 118 illustrated in FIG. 3A. In this embodiment, supply voltage generating circuit 118 comprises a simple half wave rectifier D1 and smoothing circuit C1 in series between the communications bus 104 conductors 122 and 124. This produces a slave circuit supply voltage Vcm at a common node 302 of diode D1 and capacitor C1 with an average value much closer to V1 than in the embodiment illustrated in FIG. 2A, but with a significant ripple voltage, as shown in FIG. 3B.

Figure 4A:
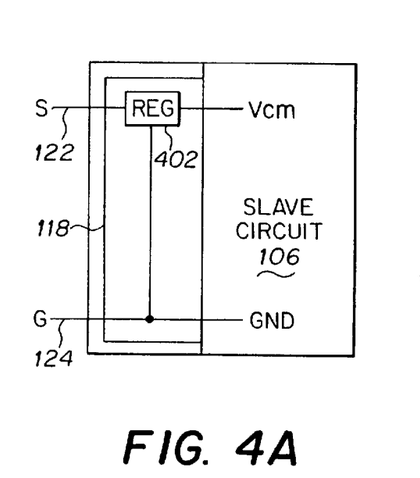
FIG. 4A shows a voltage supply circuit that may be used in the system of FIG. 1.
Figure 4B:
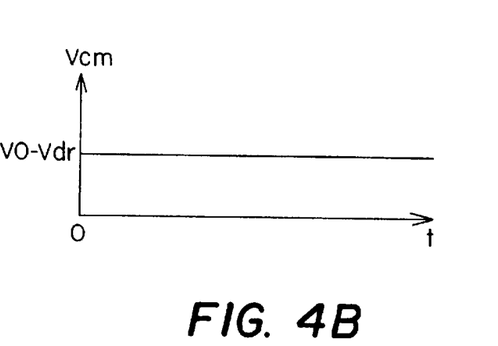
FIG. 4B shows a supply voltage of the voltage supply circuit illustrated in FIG. 4A.

FIG. 4A is a schematic block diagram illustrating another embodiment of supply voltage generating circuit 118. FIG.

4B is a signal diagram of a supply voltage of the slave voltage generating circuit 118 illustration in FIG. 4A. Supply voltage generating circuit 118 comprises a three-terminal voltage regulator 402, connected between the S conductor 122, the conductor 124, and the supply Vcm input of the slave circuit 106. This has the advantage of giving a very stable voltage output Vcm, as shown in FIG. 4B, but at a value generally less than V0 by an amount Vdr, the voltage drop due to the regulator 402. In certain aspects of the invention, this voltage drop is zero, resulting in the voltage output Vcm having a value of V0.

Figure 5A:
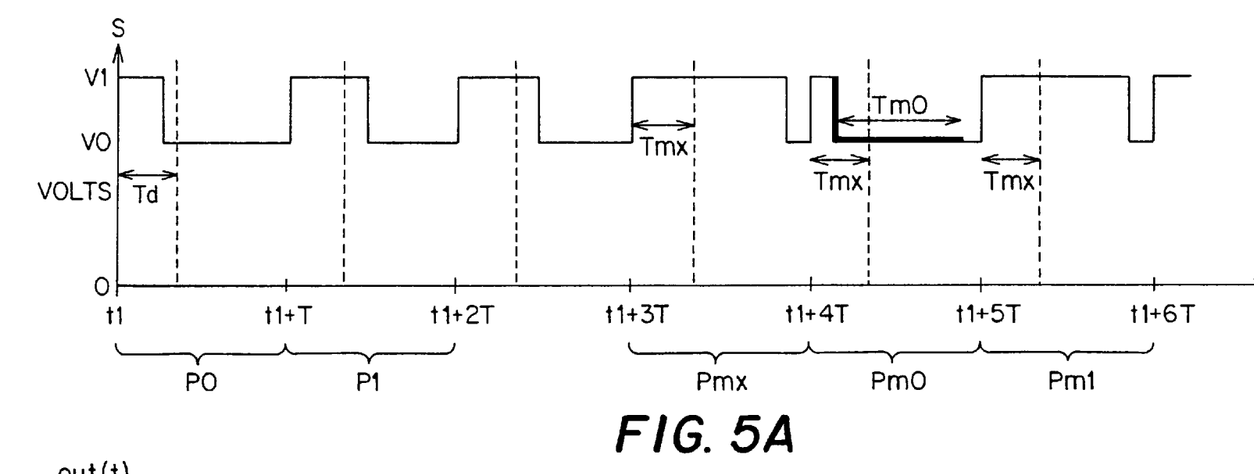
FIG. 5A shows a signal transmitted along the data bus of the system of FIG. 1.

FIG. 5A shows an extract of a typical communication along the communication bus of the invention. The digital data transmitted by the communications bus of the invention is carried in a sequence of pulses varying between the voltages V0 and V1 as shown in FIG. 2B. To isolate these pulses, a voltage comparator may be used in the slave circuit 106, with a threshold value set between V0 and V1.

Figure 5B:
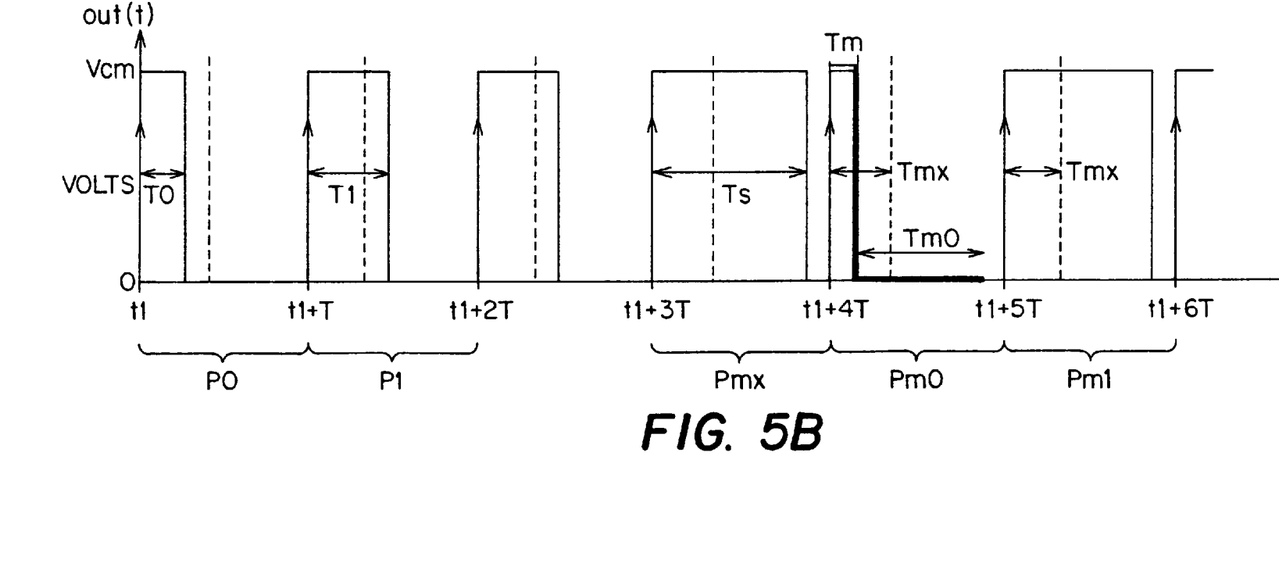
FIG. 5B shows the signal of FIG. 5A after passing through a threshold circuit.

A signal out(t) shown in FIG. 5B may be produced by such a comparator, which translates a high voltage V1 on the signal conductor 122 to a high value (boolean value 1) at approximately the supply level Vcm of the comparator; and a low voltage V0 on the signal conductor 122 to a low value (boolean 0) at approximately the voltage of the ground conductor 124.

The signal on conductor 122 is so designed that each rising transition corresponds to a clocking edge, indicated by arrowheads on the rising edges in FIG. 5B. Thus, each 0 to 1 transition of the out(t) signal is at a fixed delay T from the previous one.

Periods P0, P1 in FIGS. 5A, 5B represent the transmission of data bits representing a 0 and a 1, respectively. Each period is of duration T, and lasts from a start time t1 until a time t1+T, and from time t1+T to time t1+2T, respectively. In period P0, a rising edge is present at instant t1 to indicate the beginning of a clock period. Signals out(t) and S remain at their respective high values for a duration T0, then return to their respective low values. A subsequent period P1 begins at instant t1+T, one clock period T after the rising edge at t1.

In period P1, a rising edge is present at instant t1+T, to indicate the beginning of a clock period.

The signals S and out(t) remain at their respective high values for a duration T1, then return to their low values. Each of these periods P0, P1 transmits one bit of data. A subsequent period begins at instant t1+2T, one clock period T after the rising edge at t1+T.

Interpretation of these signals is performed by the input interface 114 of the slave circuit 106. The value of the signal out(t) is sampled at a delay Td after each clocking edge. These instances are indicated with a dotted line in FIGS. 5A and 5B. Td is selected to be longer than T0 but shorter than T1, so the value of this sample gives the value of the data bit being transmitted. For period P0 (at instant t1+Td) the value of the bit being transmitted is "0", while the value of the bit being transmitted for period P1 (at instant t1+T−Td) is "1".

As the data bus 104 is bidirectional, provision must be made to allow the slave circuit 106 to transmit information to the master circuit 102. The signal S supplied by the master circuit 102 must continue to send clocking edges on the data bus 104. From addressing and other data already sent to the slave circuit 106, the slave prepares itself to transmit data at the required instant. Period Pmx in FIGS. 5A and 5B indicates an enabling signal voltage transmitted by the master circuit 102 to allow the slave circuit 106 to return data. Referring to FIGS. 5A, 5B, a rising edge occurs at time t1+3T, and the signals S and out(t) remain at a high value for a delay of Ts, which may be equal to, or preferably longer than time T1.

In order to allow bidirectional communication over the data bus 104, the output interface 110 of the master circuit 102 presents a high impedance for voltages between V0 and V1, but a low impedance for voltages of V0 and less, to ensure that the voltage of the signal conductor 122 does not fall below V0.

Period Pm0 of FIGS. 5A, 5B shows the signal on conductor 122 and signal out(t) provided by the slave circuit 106 when the slave circuit 106 transmits a "0". As a reply to out(t), a low impedance circuit in the slave circuit output interface 116 pulls the signal S to the value V0, a delay of Tm after the clocking edge t1+4T, for a length of time Tm0. This length of time Tm0 is chosen to expire after Ts. The pulling of the voltage of signal conductor 122 to a low value is indicated by a thickened line in FIG. 5A. This is possible due to the output impedance of the master circuit 102, discussed earlier, which makes it easy for the slave circuit 106 to pull the signal conductor 122 to the V0 level, but not below V0. When the slave circuit 106 wishes to transmit a "1", the slave circuit 106 simply leaves the enabling signal transmitted by master circuit 102 as it is (as in period Pm1 of FIGS. 5A, 5B). The master circuit 102 samples the value of the signal S at a delay Tmx after the clocking edge. Tmx may be equal to the delay Td performed by the slave circuit 106 before sampling the value of the signal conductor 122. The sample so taken each period represents the value (0, 1) of the data bit transmitted. The data thus transmitted from the slave circuit 106 to the master circuit 102 may be stored in serial data registers in the master circuit 102, assembled into words and then interpreted as appropriate. This continues until the slave circuit 106 has transmitted all the requested data. The completion of the transmission of the requested data may be identified by the slave circuit 106 sending a certain specific code to indicate that its transmission is terminated. Alternatively, the master circuit 102 may simply cease to send enabling signals.

Figure 6A:
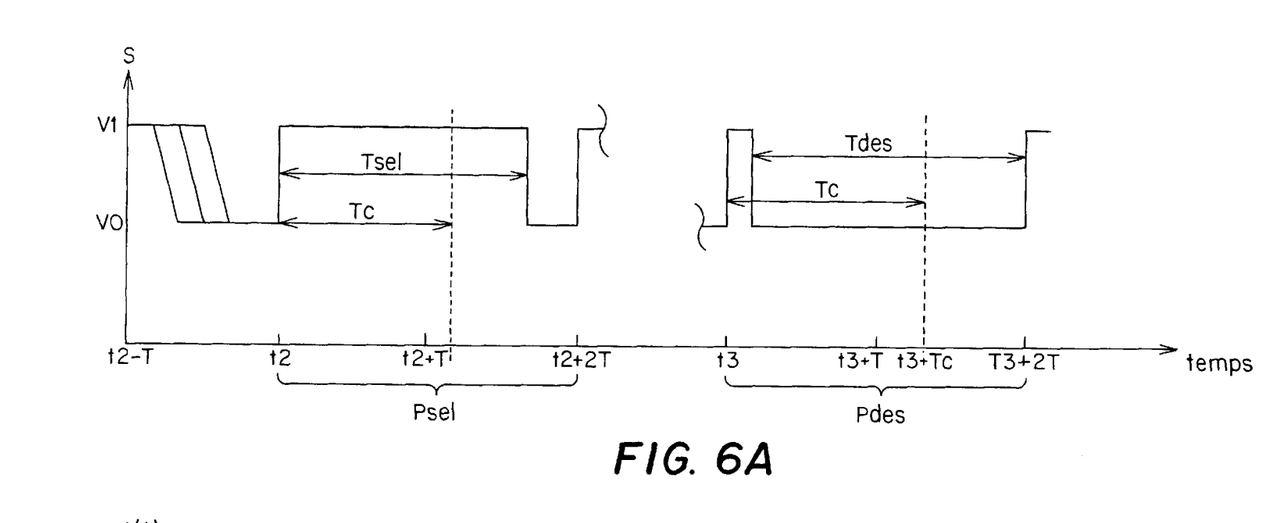
FIG. 6A shows a signal transmitted along the data bus of the system of FIG. 1.
Figure 6B:
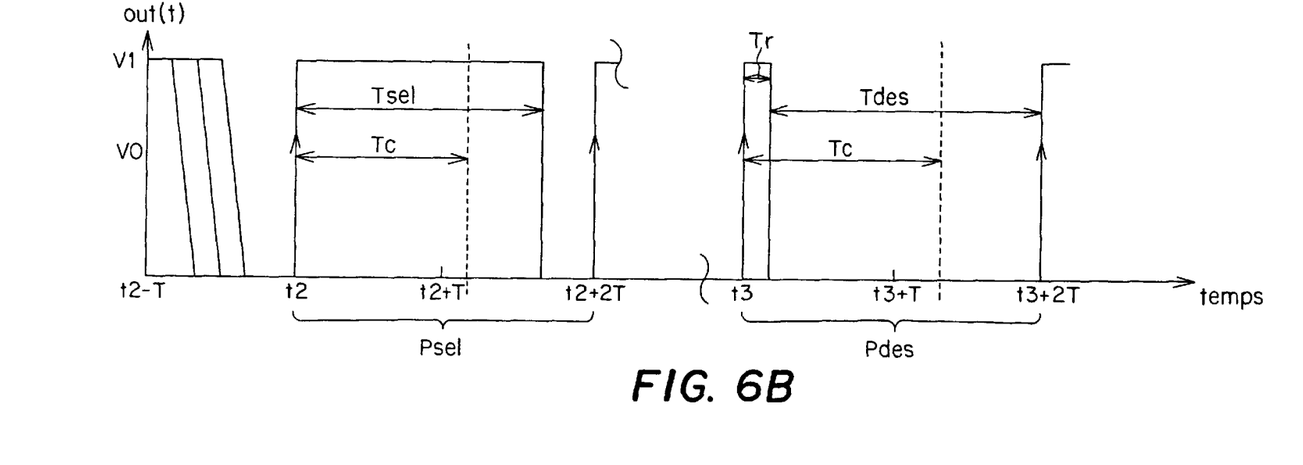
FIG. 6B shows the signal of FIG. 5A after passing through a threshold circuit.

In systems where several slave circuits 106 are connected to the same data bus 104, chip select and deselect signals may be utilized to address each circuit. FIGS. 6A and 6B show the signals S and out(t) as used to transmit chip select and deselect signals. To indicate a chip select condition (period Psel), the voltage of the signal conductor 122 is held at the high voltage V1 for a period Tsel following a clocking edge at time t2. The period Tsel is preferably longer than a clock period T and shorter than two clock periods. The signal out(t) mirrors this with a "1" value during the period t2 to t2+Tsel.

To indicate a chip deselect condition (period Pdes), the signal S becomes low, at voltage V0, at a delay Tr after the clocking edge at time t3, and remains low for a period Tdes. The delay Tr may be equal to delay T0 discussed earlier with reference to FIGS. 5A, 5B. This is mirrored by signal out(t), as shown in FIG. 6B. The period Tdes is preferably longer than a clock period T and shorter than two clock periods. The signals S and out(t) remain at their low value until a subsequent clocking edge at time t3+2T. The select and deselect signal period Tsel, Tdes, may also be longer than two clock periods, but shorter than three clock periods, or other such lengths.

For each select or deselect command, the slave circuit 106 detects a missing clock edge at times t2+T, t3+T. The value of out(t) is sampled at a delay Tc after the last clock edge when a missing clock edge is detected, and the value of this sample indicates whether the signal is a chip select (1) or deselect (0). Serial data following a chip select command can be used to provide identification characters so that a required chip is selected. As the data bus 104 can only communicate with one slave chip at a time, there is no need to send identification data with a deselect command. Simply, the previously selected chip becomes deselected.

Figure 7:
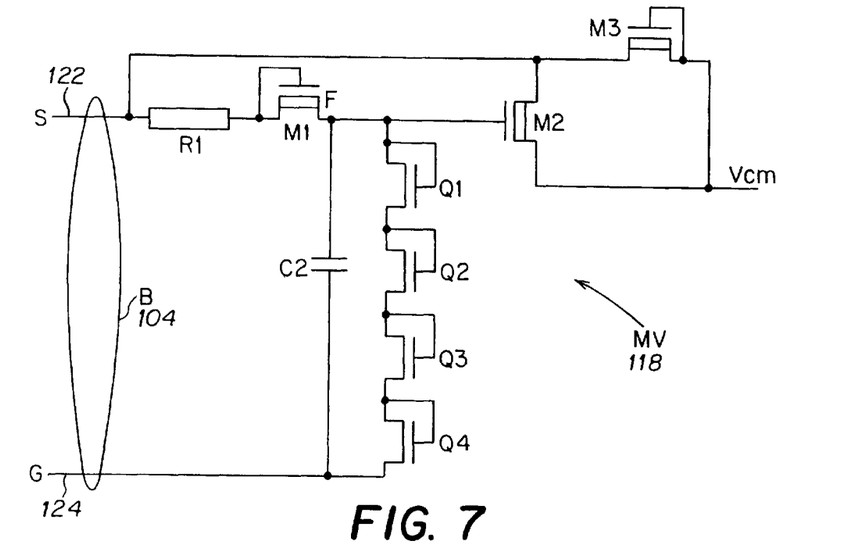
FIG. 7 shows a voltage supply used in a slave circuit according to the invention.

FIGS. 7 to 13 illustrate exemplary embodiments of circuitry which may be used to realize the communications bus 100 of the present invention. FIG. 7 shows a circuit suitable for use as a slave circuit supply voltage generating circuit 118. This circuit is a half wave rectifier and smoothing circuit. It comprises a resistor R1, a diode M1, or diode connected transistor and a capacitor C2 serially connected between the signal conductor 122 and the ground conductor 122 of the communications bus 104.

A series arrangement of transistors Q1, Q2, Q3, Q4 is connected between a common node F of transistor M1 and C2, and the conductor 124. These n-channel transistors are connected with the source of one connected to the gate and drain of the next; the source of Q4 being connected to ground conductor 124 and the gate and drain of Q1 being connected to node F.

A further transistor M2 has its channel connected between the signal conductor 122 and the Vcm output; its gate is connected to node F. A third transistor M3 has its channel connected in parallel with that of M2, but its gate connected to the Vcm output. Transistors M2, M3 have approximately identical threshold voltages.

The half wave rectifier and smoothing circuit M1, R1, C2 acts to provide a relatively constant voltage at node F, whose value lies between voltages V1 and V0. Transistors Q1, Q2, Q3, Q4 are diode connected, and preferably act to maintain a constant voltage of about 3.3V at node F. These transistors may be increased or decreased in number according to their threshold voltages and the constant voltage required. In the arrangement shown, transistor M2 acts as a voltage follower. This maintains a threshold voltage between the Vcm output and node F, and provides a low impedance supply output, by providing a current path from signal conductor 122. The supply voltage Vcm is held at about 2.8V. The output Vcm is also held at about 2.8V by transistor M3 which provides current to the output Vcm directly from the S conductor 122. This circuit provides a relatively stable supply voltage Vcm, but at a relatively low value.

Figure 8:
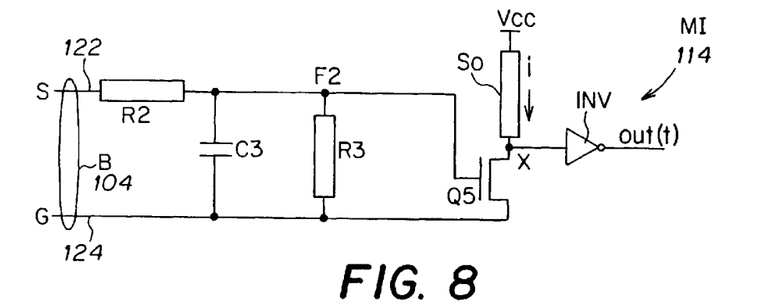
FIG. 8 shows an input interface for use in a slave circuit of the invention.

FIG. 8 shows a first possible realization of an input interface 114 for the slave circuit 106. A voltage divider comprising resistances R2, R3 is placed between the signal and ground conductors 122, 124 of the communications bus 104. A capacitor C3 is placed between the ground conductor 124 and a common node F2 of the voltage divider. Node F2 is connected to a gate of a transistor Q5, whose channel is connected between the ground conductor 124 and a node X, in common with a first terminal of a source So of current i. An inverter INV has an input connected to this node X, and an output which is the interfaced signal out(t). The current i source So may simply be a high value resistor. The resistive divider is so designed that approximately one quarter of the voltage of the signal S is applied to the gate of Q5. Capacitor C3 acts as a noise filter in combination with resistors R2, R3. This filter preferably has a time constant of around 100 ns. If, for example, R2 has a value of 300 kW, and R3 has a value of 100 kW, C3 will have a value of around 1 pF. If S varies between 5V and 3V, the voltage at node F2 will vary between 1.25V and 0.75V. Q5 thus needs to be selected to have a threshold voltage of around 1V, so that the voltage at node X is high when S is at V0, and low when S is at V1.

Figure 9:
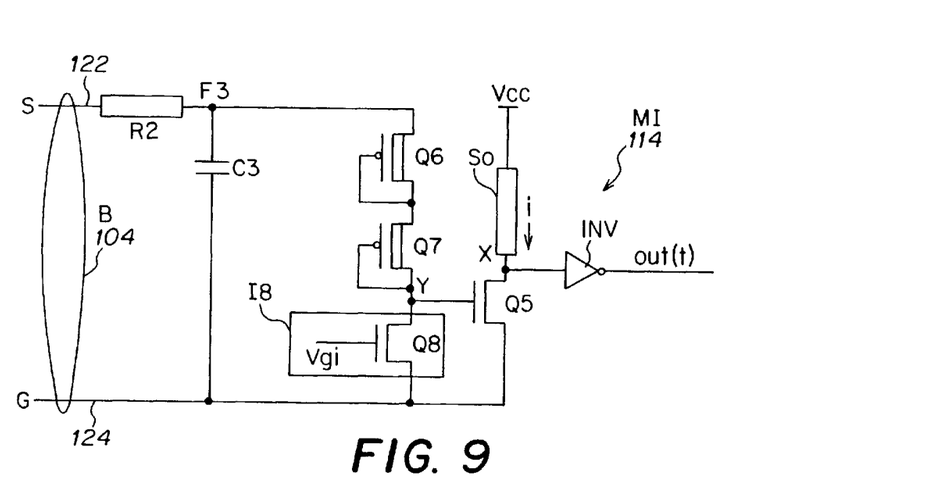
FIG. 9 shows an alternative input interface for use in a slave circuit of the invention.

FIG. 9 shows an alternative embodiment of the input interface 114 of the slave circuit 106. Features common with FIG. 8 share common reference numerals. Here, the resistor R and capacitor C3 connected between the signal and ground conductors 122, 124 of the communications bus 104 have a common node F3. A number of diode-connected transistors, for example two transistors Q6, Q7, are connected in series between node F3 and a further node Y. Node Y is connected to the gate of transistor Q5, and also connected through a current source I8 to the G conductor. Current source I8, may be a current mirror using MOS transistors, operated in saturated mode. Native n channel transistor Q8 is controlled by a gate voltage Vgi, supplied by a current mirror circuit (not shown). It may typically provide a current of 100 μA.

Capacitor C3 acts as a noise filter, in combination with resistor R2, and may have a value of about 1 pF. Transistors Q6, Q7 may be p-channel native transistors, each having a threshold voltage of about 1.5V. The voltage at node Y is thus about 3V less than the voltage at node F3. It will vary between 2V and 0V, as conductor S varies between 5V and 3V, depending on the voltage across R2.

Again, transistor Q5 acts to supply a high voltage at node X when S is low (V0), and a low voltage at node X when S is high (V1). Inverter INV rectifies the logic and provides a clean out(t) signal by a threshold action. The data so interfaced may be stored using a latch, activated once per period, according to the slave circuit clock signal, and the data bits so stored assembled together in a register for interpretation.

Figure 10:
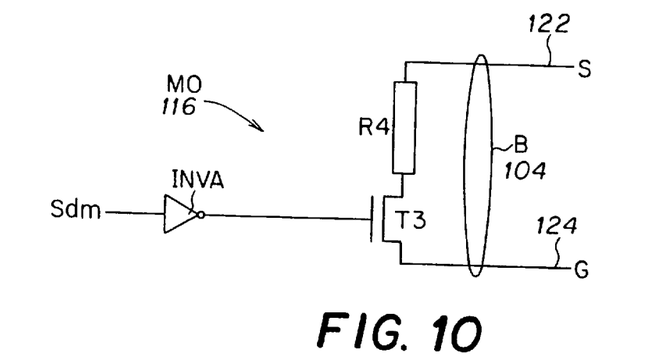
FIG. 10 shows an output interface for use in a slave circuit of the invention.

FIG. 10 shows a possible implementation of the output interface 116 of the slave circuit 106. A resistor R4 and an n channel MOS transistor T3 are respectively connected in series between the signal and ground conductors 122, 124 of the data bus 104. Data Sdm which is to be serially output is applied to a gate of a transistor T3, through an inverter INVA.

When the slave circuit 106 wishes to transmit a "0" bit, the inverter INVA applies a high voltage to the gate of T3. Transistor T3 becomes conductive, and the voltage of the signal conductor 122 approaches the voltage of the ground conductor 124, due to the short circuiting effect of transistor T3, limited by resistor R4. When the slave circuit 106 wishes to transmit a "1" bit, the inverter INVA applies a low voltage to the gate of T3. Transistor T3 is non-conductive, and the voltage of the signal converter 122 is unaffected.

Figure 11:
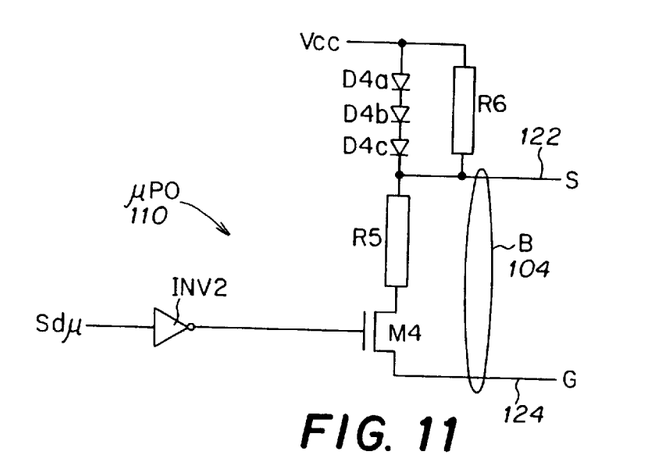
FIG. 11 shows an output interface for use in a master circuit of the invention.

FIG. 11 shows a possible implementation of the master circuit output interface 110. The serial data signal Sdμ to be sent is applied, through an inverter INV2, to a gate of an MOS transistor M4. This transistor M4 is connected, in series with a resistor R5, between the signal and ground conductors 122, 124 of the communications bus 104. A series of forward biased diodes D4a, D4b, D4c, are connected between the supply voltage Vcc and the S conductor 122. These diodes may be diode connected MOS transistors. A resistor R6 is connected in parallel with these diodes.

When the value of Sdμ is low, the inverter will cause a high voltage to be present on the gate of transistor M4, rendering it conductive. The voltage of the signal conductor 122 will then be determined by the potential divider formed by resistors R5, R6. Signal conductor 122 will therefore be at Vcc/2 if R5 is approximately equal to R6, or about 2.5V for a 5V supply Vcc.

When Sdμ is at a high level, this is inverted by inverter INV2 to apply a low voltage to the gate of transistor M4. This transistor becomes non-conductive, and the voltage of the signal conductor rises 122 to become Vcc due to the pull-up resistor R6. Forward biased diodes D4a, D4b, D4c maintain a value of about 3V on the signal conductor 122 in the event that a slave circuit 106 should attempt to pull this conductor below this value. This circuit thus has the desired high output impedance between V1 and V0, and low output impedance for values below V0, as discussed earlier.

Figure 12:
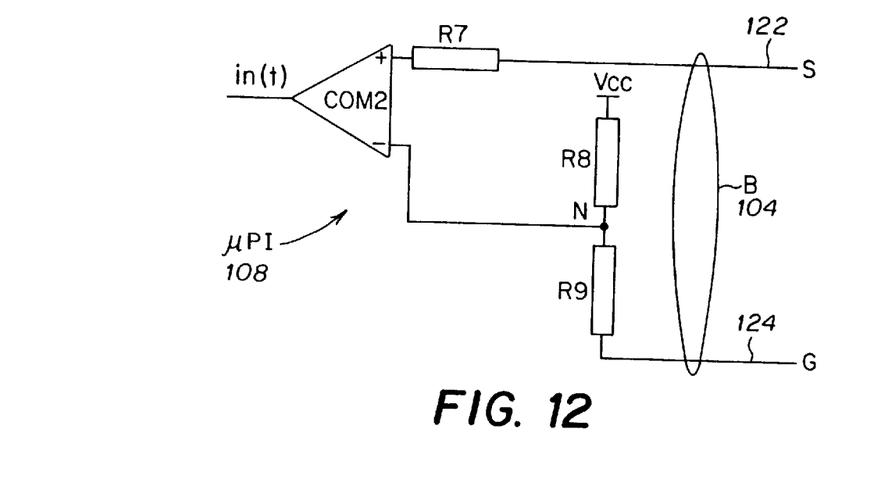
FIG. 12 shows an input interface for use in a master circuit of the invention.

FIG. 12 shows one possible realization of an input interface 108 of the master circuit 102. The signal conductor 122 is connected via a resistor R7 to a non-inverting input of a comparator COM2. A resistive divider composed of resistors R8, R9 connected between Vcc and the ground conductor 124 has a central node N connected to an inverting input of the comparator COM2. An output of the comparator provides a serial data input signal in(t) for use by the master circuit. This signal is analogous to the signal out(t) already discussed, but for input to the master circuit 102. The resistive divider is designed so that R9 has a value approximately four times that of R8. As the ground conductor 124 is connected to the ground terminal of the master circuit 102, node will have a voltage of around 4V.

When the voltage of the signal conductor 122 is above the voltage of node N, the output in(t) of the comparator will be high; when the voltage of the signal conductor 122 is below this value, the output in(t) will be low. The master circuit 102 will interpret the data so received by storing the signals in(t) in, for example, a shift register.

Decoding and interpretation of signals sent on the communications bus 104 of the invention depends on accurate timing of sampling and generation of the voltage on the signal conductor 122. As clocking edges are continuously provided by the master circuit 102, the slave circuit 106 only has to measure timing delays relative to the most recent clocking edge. The simplest way of achieving this is to use a timer which is reset at each clocking edge.

Figure 13A:
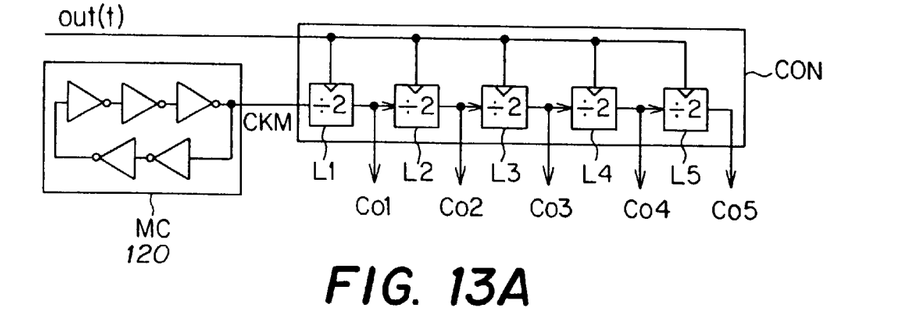
FIG. 13A shows a timing circuit for use in the communications system of the invention.

FIG. 13A shows a possible implementation of the timing circuit of the slave device. In this slave circuit, the slave circuit clock generator 120 generates a clock signal CKM at, for example, 2 MHz, to an input of a multistage counter CON comprising a series of latches L1–L6. A rising-edge sensitive reset of each latch is connected to receive the out(t) signal. The clock generator 120 may be very simple, such as ring oscillator.

Figure 13B:
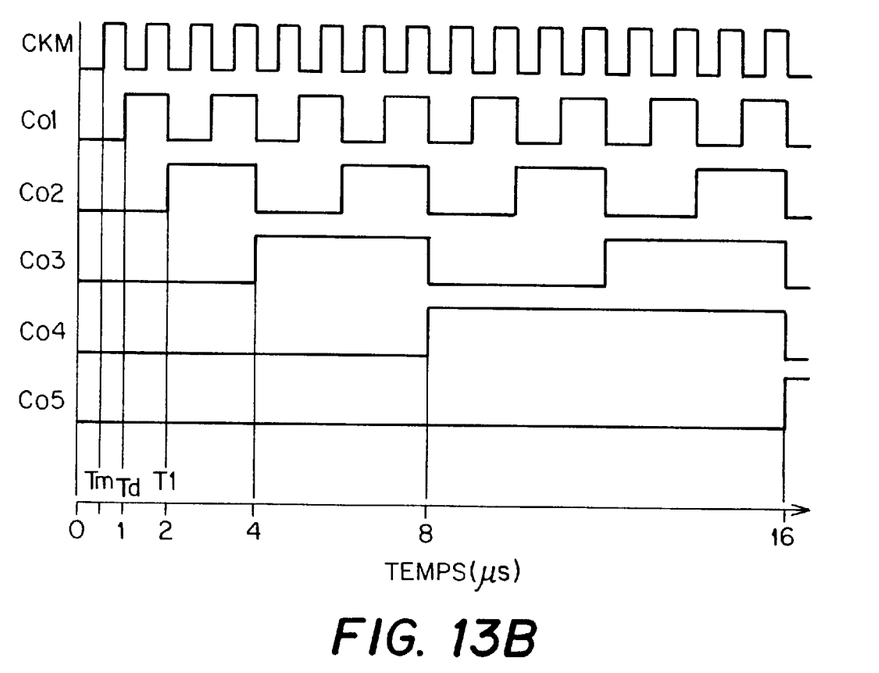
FIG. 13B shows signals occurring in the circuit of FIG. 13A.

As shown in FIG. 13B, output signals Co1–Co6 of each latch provide a first rising transition within 1, 2, 4, 8, 16, 32 periods of the clock signal CKM, respectively, after being reset by each clocking edge of the out(t) signal. As the clocking edge of signal out(t) resets the counter CON, but does not synchronize the clock signal CKM, the transitions supplied by the latches may not be offset by an integral number of CKM clock periods after the clocking edge of signal out(t). Each of the latch output signals is used to time an event in the protocol of the invention. As each timed delay is relative to the most recent clocking edge of the signal out(t) provided by the master circuit 102, this timing circuit does not need to be especially accurate.

Co1 provides a rising edge within 500 ns after the clocking edge of the signal out(t) (for the 2 MHz clock mentioned above). This may be used to time the delay Tm after which the signal conductor 122 may be pulled to its lower (V0) value, to transmit a "0" bit.

Co2 provides a rising edge within 1 $\mu$s after the clocking edge of the signal out(t). This may be used to time the delay Td for detection of 0 or 1 in a transmission from the master circuit 102.

Co3 provides a rising edge within 2 $\mu$s of the clocking edge of the signal out(t). This may be used to time the end T1 of the high (V1) voltage emitted by the master circuit 102 as an enabling signal to allow the slave circuit 106 to transmit data.

Co4 provides a rising edge within 4 $\mu$s of the clocking edge of the signal out(t). This may be used to time the end of the period Tm0 within which the slave circuit 106 may pull the S conductor 122 to its lower (V0) value.

Co5 provides a rising edge within 8 $\mu$s of the clocking edge of the signal out(t). This may be approximately equal to a clocking period T of the master circuit 102.

Co6 provides a rising edge within 16 $\mu$s of the clocking edge of the signal out(t). This may be significantly longer than a clock period, and may be used to time the delay Tc necessary to detect a chip select or deselect signal.

The duration T0 of a pulse emitted by the master circuit in transmitting a "0" may be substantially equal to Tm. A very simple timer will normally suffice, as it is re-synchronized to the master circuit timing by every clocking edge of signal out(t). Although the timing used by the master circuit 102 and the slave circuit 106 should be substantially identical, a variation as great as 30–40% in the accuracy of the slave timer as compared to the master timer may be tolerated. Such variation may be due to a number of factors, including process variation and ambient temperature changes. It is for this reason that each timed delay in the above example is twice as long as the previous timed delay.

A series of monostables could be used as a timing circuit, or a PLL-based timer, if higher accuracy is required.

Figure 14:
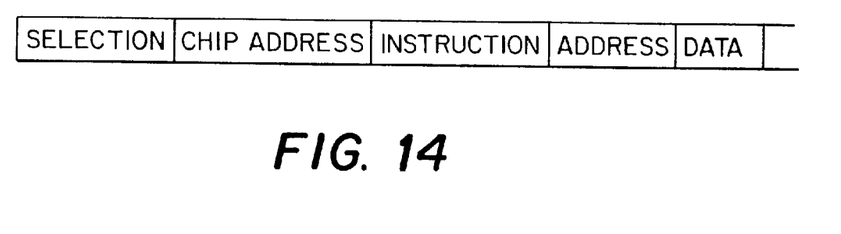
FIG. 14 shows a sequence of data typically transmitted within the system of the invention.

FIG. 14 illustrates the possible contents of a bidirectional communication over the communications bus 100 of the invention. Firstly, a chip select command is sent to enable a slave circuit 106. If many slave circuits are connected to the communications bus, a chip address may be sent after the select command, to identify which chip needs to be enabled. Then, an instruction may be sent (an "opcode"), followed by the address of the memory cell that the instruction needs to be carried out upon, followed by data needed to perform the instruction. The opcode-address-data sequence may be repeated many times to transfer all data or instructions required. To enable the slave circuit 106 to transmit information to the master circuit 102, the opcode transfer may be replaced by enabling signals Pm0, Pm1 as described above in relation to FIGS. 5A and 5B.

The bidirectional two wire communications bus according to the invention may advantageously be used to communicate with tags embedded in articles. For example, cartridges filled with toner for use in printers may be provided with a tag, and a data bus according to the invention used to ensure communication between this tag and a host microprocessor, either within the printer or within a host computer. The tag may give information about the cartridge, its age, toner type, the amount of toner remaining and an identification code entered by the manufacturer. This information may be read by the host microprocessor to determine whether the correct type of cartridge is being used, whether enough toner is available for a requested print job, or whether the desired type of toner is present. The host microprocessor may give suitable warning messages to an operator.

Similar considerations apply to tags for any low cost consumable or exchangeable component—battery packs, photographic film, even automotive components, where the combination of a low data rate together with very simple installation of the data bus and very inexpensive slave circuits makes such a solution attractive.

Having thus described particular embodiments of the invention, various alterations, modifications and improve- ments will readily occur to those skilled in the art. In particular, the polarity and logical significance of the signals may be reversed; a negative supply voltage may be transmitted, the ground conductor G may be at a fixed voltage other than ground, or a differential signal may be transmitted on the two conductors 122, 124.

Selection of transistors used as diodes depends on the polarity required, and the forward voltage drop required. The n channel MOS transistors used for switching could be replaced by equivalent np bipolar transistors. Also, a p channel MOS or np bipolar could be used, if the polarity of the gate signals are inverted. Similarly for p channel MOS transistors used for switching. The clock signal derived from the rising edges may be supplied to a phase locked loop which generates a much higher clock frequency for the slave circuit's internal operation.

Accordingly, the foregoing description is by way of example only and is not intended as limiting. The invention is limited only as defined in the following claims and equivalents thereto.

What is claimed is:

1. A method for encoding and transmitting a clock signal, a supply voltage and bidirectional digital data from a master circuit to a slave circuit, comprising the steps of:
   (a) holding a first conductor at a first voltage;
   (b) periodically holding the first conductor at a second voltage greater than said first voltage for first predetermined periods, each occurring at a fixed period after a previous instance of raising the first conductor to said second voltage, said first predetermined periods having a logical significance;
   (c) returning, after said step (b), the first conductor to said first voltage for a second predetermined period having a logical significance;
   (d) holding a second conductor at a third voltage different from said first and second voltages;
   (e) measuring a voltage of the first conductor at a temporal offset with respect to said instant of said raising of the first conductor to said second voltage;
   (f) interpreting said measured voltage from said step (e) according to said predetermined logical significances; and
   (g) raising the first conductor to said second voltage to identify a clock signal.

2. The method according to claim 1, wherein said step (b) comprises the step of:
   (1) holding the first conductor at said predetermined period of a first duration signifying a "0" bit.

3. The method according to claim 2, wherein said step (b) further comprises the step of:
   (2) holding the first conductor at said predetermined period of a second duration signifying a "1" bit.

4. The method according to claim 3, wherein one of said first and second predetermined periods is longer than said fixed period to indicate a chip select command.

5. The method according to claim 1, wherein one of said first and second predetermined periods is longer than said fixed period to indicate a chip select command.

6. The method according to claim 1, further comprising the steps of:
   (h) emitting, by the master circuit, a series of pulses on the first conductor at said second voltage; and
   (I) pulling, by the slave circuit, the second conductor to a fourth voltage to indicate a first polarity of a transmitted bit.

7. The method according to claim 5, further comprising the steps of:
   (h) emitting, by the master circuit, a series of pulses on the first conductor at said second voltage; and
   (I) pulling, by the slave circuit, the second conductor to a fourth voltage to indicate a first polarity of a transmitted bit.

8. The method according to claim 4, further comprising the steps of:
   (h) emitting, by the master circuit, a series of pulses on the first conductor at said second voltage; and
   (I) pulling, by the slave circuit, the second conductor to a fourth voltage to indicate a first polarity of a transmitted bit.

9. The method according to claim 6, wherein said fourth voltage is equal to said first voltage.

10. The method according to claim 7, wherein said fourth voltage is equal to said first voltage.

11. The method according to claim 8, wherein said fourth voltage is equal to said first voltage.

12. The method according to claim 1, wherein said step (b) is performed after an extended period exceeding said fixed period after an occurrence of said step (a) to define one of a chip select and deselect signal, depending upon the voltage present on the second conductor during said extended period.

13. The method according to claim 11, wherein said step (b) is performed after an extended period exceeding said fixed period after an occurrence of said step (a) to define one of a chip select and deselect signal, depending upon the voltage present on the second conductor during said extended period.

14. A data communications system comprising:
   a communications bus solely comprising first and second conductors;
   a master circuit communicably coupled to said communications bus including an output interface configured to hold said first conductor at one of two predetermined potentials, said output interface constructed and arranged to bring the potential of said first conductor regularly, repeatedly, and with a fixed period, to a second potential for first predetermined periods of time before returning to said first potential for second predetermined periods of time, each said first and second predetermined periods having a logical significance; and
   a slave circuit communicably coupled to said communications bus comprising a timing circuit for providing a number of preset delays from reception of each transition on said first conductor, and for measuring the voltage on said first conductor by comparison with a predetermined reference value which lies between said first voltage and said second voltage.

15. The data communications system according to claim 14, wherein said master circuit output interface has an output impedance for voltages between said first and second voltages substantially higher than its output impedance for voltages of magnitude below a lower one of said first and second voltages.

16. The data communications system according to claim 15, wherein said slave circuit comprises:
   an output interface for providing a low impedance path between said first conductor and said second conductor to transmit a signal of a first polarity to said master circuit,
   wherein said output interface of said slave circuit removes said low impedance path between said first conductor and said second conductor to transmit a signal of second polarity to said master circuit.

17. The data communications system according to claim 14, wherein said slave circuit comprises:

an output interface for providing a low impedance path between said first conductor and said second conductor to transmit a signal of a first polarity to said master circuit, wherein said output interface of said slave circuit removes said low impedance path between said first conductor and said second conductor to transmit a signal of second polarity to said master circuit.

18. An identification tag including a slave circuit comprising an input interface, an output interface, a timing circuit and a supply voltage generating circuit, said slave circuit being connected to two external conductors and deriving its power from a dc voltage that is continually present between said two conductors, said timing circuit timing delays relative to periodic changes in said voltage between the two conductors, said output interface providing a low impedance path between the two conductors to transmit a signal of a first polarity, and no such low impedance path to transmit a signal of second polarity, wherein the potential of a first conductor is brought from a first potential to a second potential for first predetermined periods of time before returning to said first potential for second predetermined periods of time, each said first and second predetermined periods having a logical significance, and wherein said timing circuit is constructed and arranged to provide a number of preset delays from reception of each transition on said first conductor, and to measure the voltage on said first conductor by comparison with a predetermined reference value which lies between said first voltage and said second voltage.

19. A toner cartridge for a printer containing an identification tag according to claim 18.

20. A method for encoding and transmitting a clock signal, a supply voltage and bidirectional digital data from a master circuit to a slave circuit, comprising the steps of:

(a) holding a first conductor at a first voltage for a first period;

(b) periodically holding the first conductor at a second voltage greater than said first voltage for first predetermined periods, each occurring at a fixed period after a previous instance of raising the first conductor to said second voltage, said first predetermined periods having a logical significance;

(c) returning, after said step (b), the first conductor to said first voltage for a second predetermined period having a logical significance;

(d) holding a second conductor at a third voltage different from said first and second voltages;

(e) measuring a voltage of the first conductor at a temporal offset with respect to said instant of said raising of the first conductor to said second voltage;

(f) interpreting said measured voltage from said step (e) according to said predetermined logical significances.

21. The method of claim 20, further comprising the step of:

(g) raising the first conductor to said second voltage to identify a clock signal.

22. The method according to claim 21, wherein said step (b) comprises the steps of:

(1) holding the first conductor at said predetermined period of a first duration signifying a "0" bit; and (2) holding the first conductor at said predetermined period of a second duration signifying a "1" bit.

23. The method according to claim 21, wherein one of said first and second predetermined periods is longer than said fixed period to indicate a chip select command and another of said first and second predetermined periods is longer than said fixed period to indicate a chip deselect command.

24. The method according to claim 20, further comprising the steps of:

(g) emitting, by the master circuit, a series of pulses on the first conductor at said second voltage; and (h) pulling, by the slave circuit, the second conductor to a fourth voltage to indicate a first polarity of a transmitted bit.

25. The method according to claim 24, wherein said fourth voltage is equal to said first voltage.

26. The method according to claim 20, wherein said step (b) is performed after an extended period exceeding said fixed period after an occurrence of said step (a) to define one of a chip select and deselect signal, depending upon the voltage present on the second conductor during said extended period.

27. A data communications system comprising:

a communications bus solely comprising first and second conductors;

a master circuit communicably coupled to said communications bus including, means for bringing the potential of said first conductor regularly, repeatedly, and with a fixed period, to a second potential for first predetermined periods of time before returning to said first potential for second predetermined periods of time, each said first and second predetermined periods having a logical significance; and a slave circuit communicably coupled to said communications bus, including timing means for providing a number of preset delays from reception of each transition on said first conductor, and measuring means, responsive to said timing means, for measuring the voltage on said first conductor by comparison with a predetermined reference value which lies between said first voltage and said second voltage.

28. The data communications system according to claim 27, wherein said master circuit output interface has an output impedance for voltages between said first and second voltages substantially higher than its output impedance for voltages of magnitude below a lower one of said first and second voltages.

29. The data communications system according to claim 27, wherein said slave circuit comprises:

means for providing a low impedance path between said first conductor and said second conductor to transmit a signal of a first polarity to said master circuit; and means for removing said low impedance path between said first conductor and said second conductor to transmit a signal of second polarity to said master circuit.

30. A disposable item containing an identification tag according to claim 18.

31. A method for encoding and transmitting a clock signal, a supply voltage and bidirectional digital data from a master circuit to a slave circuit, comprising the steps of:

(a) holding a first conductor at a first voltage;
(b) periodically raising the first conductor to a second voltage greater than said first voltage for a first predetermined period of time;
(c) returning, after said step (b), the first conductor to said first voltage for a second predetermined period, wherein one of said first and second predetermined periods is longer than said fixed period to indicate a chip select command;
(d) holding a second conductor at a third voltage different from said first and second voltages;
(e) measuring a voltage of the first conductor at a temporal offset with respect to said instant of said raising of the first conductor to said second voltage;
(f) interpreting said measured voltage from said step (e) according to said predetermined logical significances; and
(g) raising the first conductor to said second voltage to identify a clock signal.

32. The method according to claim 31, further comprising the steps of:
(h) emitting, by the master circuit, a series of pulses on the first conductor at said second voltage; and
(I) pulling, by the slave circuit, the second conductor to a fourth voltage to indicate a first polarity of a transmitted bit.

* * * * *

UNITED STATES PATENT AND TRADEMARK OFFICE
CERTIFICATE OF CORRECTION

PATENT NO. : 5,903,607
DATED : May 11, 1999
INVENTOR(S): François Pierre Tailliet It is certified that error appears in the above-identified patent and that said Letters Patent is hereby corrected as shown below:

Col. 2, line 14, should read:
    the predetermined periods so each have a logical signifi- Col. 3, line 18, should read:
    for communicating with the identification tag is disclosed. The Col. 7, line 15, should read:
    124 of the communications bus 104.

Signed and Sealed this

Fourth Day of April, 2000

Q. TODD DICKINSON

*Attest:*

*Attesting Officer*      *Director of Patents and Trademarks*